Nov. 22, 1955  J. T. GRUETZNER  2,724,312
MEANS FOR OBTAINING THREE-DIMENSIONAL PHOTOGRAPHY
Filed May 7, 1952  2 Sheets-Sheet 1

INVENTOR.
JOHN T. GRUETZNER
BY
ATTORNEYS

Nov. 22, 1955  J. T. GRUETZNER  2,724,312
MEANS FOR OBTAINING THREE-DIMENSIONAL PHOTOGRAPHY
Filed May 7, 1952  2 Sheets-Sheet 2

INVENTOR.
JOHN T. GRUETZNER
BY
ATTORNEYS

United States Patent Office 2,724,312
Patented Nov. 22, 1955

2,724,312

MEANS FOR OBTAINING THREE-DIMENSIONAL PHOTOGRAPHY

John T. Gruetzner, Audubon, N. J.

Application May 7, 1952, Serial No. 286,592

3 Claims. (Cl. 95—18)

(Granted under Title 35, U. S. Code (1952), sec. 266)

The invention described herein may be manufactured and used by or for the government of the United States of America for governmental purposes without the payment of any royalties thereon or therefor.

This invention relates to stereoscopic pictures and is particularly concerned with the solution of the hitherto unsolved problem of registering depth in a picture when viewed from any desired angle.

The search for a method of producing three-dimensional or stereoscopic pictures has been in progress for a great number of years and included among other expedients tried with various degrees of success have been the grid system wherein a screen containing a large number of vertically spaced parallel opaque bars forming a grating is placed in front of a projection screen, the grating in the grid being designed so that the right eye sees only that portion of the screen on which the picture record for the right eye appears, the bars in the grating hiding the left eye image from the right eye and wherein the same effect is provided for the left eye. The chief difficulty in this system is that the observer's viewing distance, angle of view and of eye placement in relation to the grid are of a fixed interlocking relationship. Disturb one of the three and proper viewing fails. Furthermore, while a light loss is common to all stereo projection systems, it is particularly severe in this one, due to the fact that the opaque areas in the grating have usually to be about three times that of the open areas in order to keep the images from overlapping.

Another proposed method has been the so-called "integral system" wherein is utilized a screen composed of an almost infinite number of small lens elements in the form of pin-holes. Exposure is made through the pin-holes, and since the effective aperture of each pin-hole is extremely small, long time exposures are essential. No camera is used and the pictures cannot satisfactorily be produced; hence copies are not obtainable.

A third method has been the so-called "lenticular" system, a variation of the grid system wherein there is a product consisting of a sheet of material capable of bearing a composite picture of a pair of stereoscopic views disposed in narrow parallel and alternating strips, the picture surface being covered with a film-like transparent material having its upper surface formed in ridges paralleling and mating with the picture strips, and forming cylindrical lenses or lenticules through which the composite views are coordinated in a single picture appearing to be in three dimensions. The lenticules do not cut down the reflected light as do the bars in the grid system, but the picture still loses its three-dimensional effect if the position of the viewer varies greatly. In most of these prior methods, depth is registered only when the picture is viewed within an arc of less than 180 degrees. If the picture is rotated around an axis perpendicular to the eye, the depth perception is lost. Depth in these cases, diminishes in direct proportion to the degree of rotation from the true vertical and approaches zero at 90 degrees rotation from this position.

In the present invention, a pattern of tiny spherical lenses is embossed on the film base while the film is being cast. Each of these small lenses is adapted to focus the light beams accurately on the emulsion on the other side of the film. The spherical shape of the lenses will enable depth to be registered from all angles of view.

One object of this invention is to provide a film for presenting a steroscopic or three-dimensional picture to the eyes of an observer without the assistance of additional viewing or projecting devices.

Another object of this invention is to provide a film for presenting stereoscopic pictures whose three-dimensinal effect will not be lessened by rotation of the picture or by a change of position of the observer.

A further object of this invention to to provide new and improved photographic means for obtaining stereoscopic pictures.

A still further object of this invention is to provide a new and improved method of manufacture of the lens-embossed film.

Other objects and many of the attendant advantages of this invention will be readily appreciated as the same becomes better understood by reference to the following detailed description when considered in connection with the accompanying drawings wherein.

Figure 1:
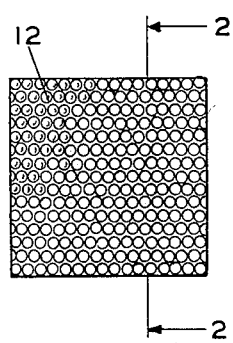
Fig. 1 is a front view of the film provided with the spherical lenses.
Figure 2:
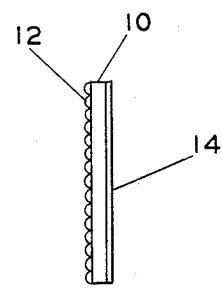
Fig. 2 is a cross-sectional view taken on the line 2—2 of Fig. 1.

Referring now to these figures, there is shown in Fig. 1 a strip of film 10 upon one face of which is embossed a pattern of tiny lenses 12. These lenses are formed as close to each other as possible in order that the greatest film area be covered with the lenses. The size of these lenses is minute and their number in a given area is great; for instance, on a test sample there were forty thousand lenses to the square inch.

Figure 3:
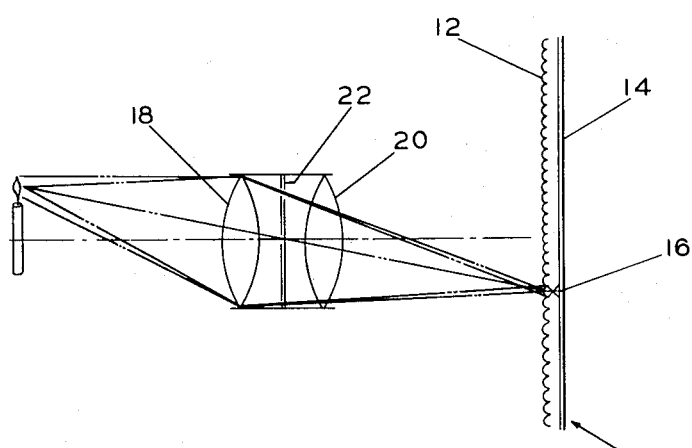
Fig. 3 is a diagram of the principles employed and showing a cross-sectional view of the diaphragm and embossed film.

On the other face of the film is provided the emulsion 14 and each one of the embossed lenses is adapted to focus the light rays accurately on the emulsion as generally shown at 16 in Fig. 3.

The picture is taken with a camera that has a lens with an interpupilary distance or lens opening of a very large diameter, generally not less than 2¾ inches. It is absolutely necessary that the full width of the camera lens opening be retained so that the lens can, in a manner of speaking, see around an object. In Fig. 3 is shown a diagrammatic illustration of the action of the light rays in passing through the camera lens element openings and in being refracted by the embossed film lenses onto the film emulsion. The outer lens member 18 and the inner lens member 20 are shown as single lens elements; however, this is merely for diagrammatic purposes since, in actuality, the lens members used in this invention comprise multiple lens elements.

Figure 4:
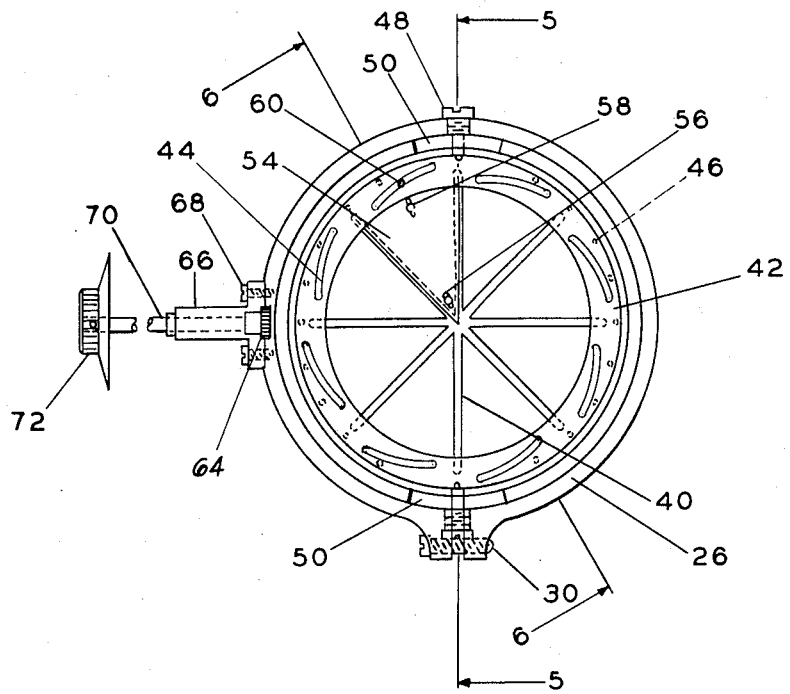
Fig. 4 is a front view of the diaphragm assembly.
Figure 6:
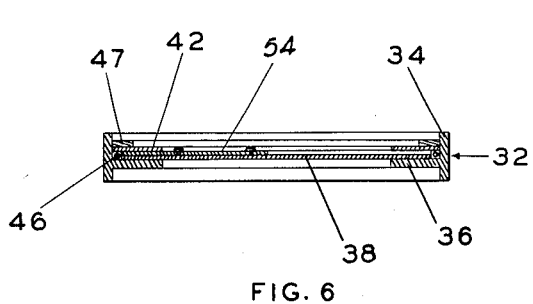
Fig. 6 is a cross-sectional view taken on the line 6—6 of Fig. 4.
Figure 5:
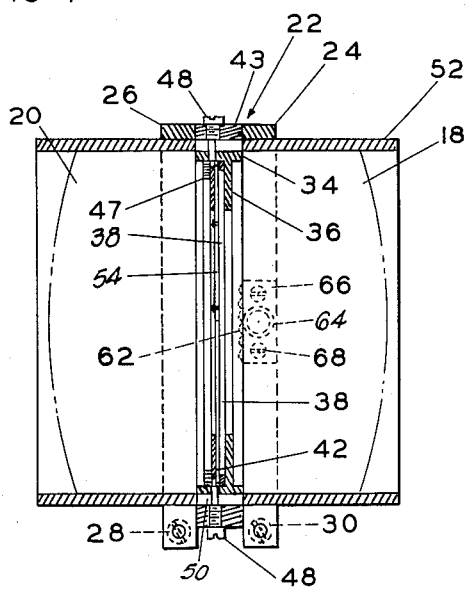
Fig. 5 is a cross-sectional view taken on the line 5—5 of Fig. 4.
Figure 9:
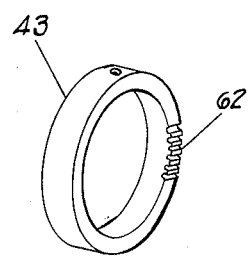
Fig. 9 is a perspective view of the outer rotatable ring.

Between the two lens members 18 and 20 is inserted a diaphragm member 22. This diaphragm member, unlike the ordinary iris type of diaphragm, retains the full width of the lens opening while at the same time being adapted to adjustably control the amount of light entering the camera. The diaphragm member assembly is best illustrated in Figs. 4, 5 and 6 of the drawings and comprises two clamping rings 24 and 26, the ring 26 being held in clamped position on the lens barrel by bolt 28 and the ring 24 being held in clamped position on the barrel by bolt 30. Held between these two clamping rings 24 and 26 is the diaphragm unit 32 which comprises the diaphragm holder 34 in the form of a ring having an interior flange 36 upon which rests the diaphragm 38. The diaphragm 38 is a very thin disc having a plurality of criss-crossing slits 40. An actuating ring 42 overlies the diaphragm and this ring 42 is provided with a series of inclined slots 44. Between the diaphragm 38 and the ring 42 is provided a ball bearing means consisting of a plurality of balls 46. By the provision of this ball bearing means there is eliminated the necessity of constant lubrication between the parts. A pair of screw members 48, 180 degrees apart, connect the ring 42 to a rotatable ring 43. These screw members act as stops which have a freedom of play that is limited by the edges of a pair of slots 50 which are provided in the lens barrel 52 and which are each equal in length to one of the slots 44. A plurality of segments 54 equal in number to the slits 40 but only one of which is shown in the drawing are provided between the diaphragm 38 and the ring 42. Each of these segments is provided with a pair of slots 56 which are adapted to receive a pair of pins 58 extending from the diaphragm 38. Each of the segments is also provided with a pin 60 which is adapted to ride in a corresponding slot 44. A split spring retainer ring 47 holds all these parts of the diaphragm unit 32 in assembled relation.

A rack 62 is provided on ring 43 and this rack meshes with a pinion 64 which is carried by a shaft 70 passing through a sleeve 66. The sleeve 66 is attached to the clamping ring 24 by bolts 68. The shaft 70 is rotated by turning a dial 72 which is calibrated in $f$ stops.

In operation, when it is desired to regulate the amount of light entering the camera lens through the diaphragm, the calibrated dial 72 is rotated to the desired $f$ stop. The dial turns the shaft 70 which, in turn, rotates the pinion 64 which acts on the rack 62 attached to the rotatable ring 43. The ring 43 thereby rotates the ring 42 through the screw members 48, and the inclined slots 44 on the ring 42, thereupon, act to move the pins 60, which are connected to the segments 54, in an inclined plane. The segments are thereby moved radially in or out, this movement of the segments being controlled in a straight line by the guide pins 58 which extend through the slots 56. As the segments move out they uncover a greater area of the slits 40 on either side of the segments, yet the length of the openings remains the same. The ring is free to rotate only to the extent allowed by the length of the slots 50 since the stops 48 will abut against the edges of these slots when the ring is rotated sufficiently in either direction. The length of these slots 50 which are determined by the length of the slots 44 will vary, depending on the size and proportions of the diaphragm and lens assemblies.

Figure 7:
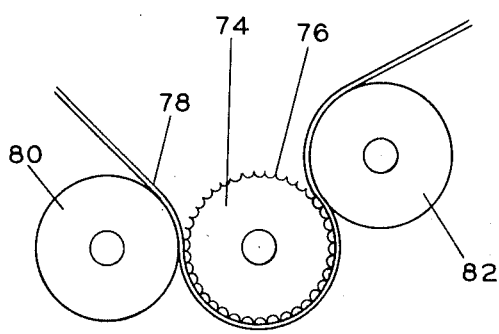
Fig. 7 is a vertical sectional view through an apparatus for embossing the film.
Figure 8:
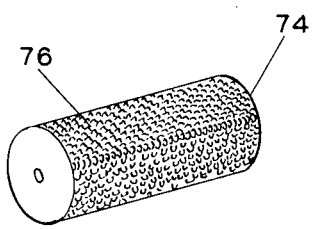
Fig. 8 is a perspective view of the embossing roller.

In regard to the embossing of the film with the tiny lenses, various procedures may be used. One procedure which is illustrated in Figs. 7 and 8 comprises the use of a roller 74, which roller is made of a homogeneous metal and the periphery of which is polished to a mirror-like finish. This periphery is provided with a multitude of closely spaced indentations 76 of a spherical shape. The film strip 78, while yet in a soft, plastic condition, is passed between a roller 80 and the roller 74. The periphery of the roller 80 is also finished to a fine mirror-like surface so that the space between it and the embossing roller 74 can be accurately adjusted to control the thickness of the film which passes through this space. It is during the film's passage through the space between the rollers 74 and 80 that the embossing takes place. The film strip is then run over a guide roller 82 from which it goes to its further processing stations.

Obviously many modifications and variations of the present invention are possible in the light of the above teachings. It is therefore to be understood that within the scope of the appended claims the invention may be practical otherwise than as specifically described.

What is claimed is:

1. A diaphragm assembly for a camera comprising a disc having a central opening and a plurality of radial slots extending from said central opening toward the periphery of said disc, a pluality of segments movably overlying said disc, each of said segments having a shape conforming to the shape of the areas between each pair of adjacent slots and being of a size which is larger than the area between those edges of each pair of adjacent slots which are closest to each other, and smaller than the area between those edges of each pair of adjacent slots which are most remote from each other, said segments being radially movable toward and away from the center of said disc.

2. A diaphragm assembly comprising, a diaphragm holder, a slitted diaphragm positioned on said diaphragm holder, an actuating ring overlying said diaphragm, a plurality of segments arranged between said diaphragm and said actuating ring, means to connect said segments for radial movement with respect to said slitted diaphragm, said movable segments being adapted to cover and uncover a portion of the slits in said diaphragm upon being actuated by said actuating ring.

3. In combination, a film strip having an emulsion on one face thereof and a plurality of closely spaced minute spherical lenses on the other face thereof, a diaphragm having a plurality of slits extending substantially across the full diameter of said diaphragm, radially movable means disposed adjacent to said slits to narrow or widen the openings of said slits so as to permit a varying amount of light to impose on said film strip while maintaining light apertures of constant diameter.

References Cited in the file of this patent

UNITED STATES PATENTS

| | | |
|---|---|---|
| 992,151 | Berthon | May 16, 1911 |
| 1,843,595 | Berthon | Feb. 2, 1932 |
| 1,935,471 | Kanolt | Nov. 14, 1933 |
| 1,942,638 | Draper | Jan. 9, 1934 |
| 1,984,471 | Fischer | Dec. 18, 1934 |
| 1,994,054 | Thiry | Mar. 12, 1935 |
| 1,996,868 | Heymer | Apr. 9, 1935 |
| 2,002,090 | Ives | May 21, 1935 |
| 2,063,985 | Coffey | Dec. 15, 1936 |
| 2,090,398 | Hoyt | Aug. 17, 1937 |
| 2,185,221 | Nakken | Jan. 2, 1940 |
| 2,186,203 | Centeno | Jan. 9, 1940 |
| 2,218,227 | Winnek | Oct. 15, 1940 |
| 2,219,116 | Sauer | Oct. 22, 1940 |
| 2,357,331 | Johnson | Sept. 6, 1944 |
| 2,369,473 | Luboshez | Feb. 13, 1945 |

FOREIGN PATENTS

| | | |
|---|---|---|
| 282,253 | Great Britain | Dec. 22, 1927 |